United States Patent
Richards et al.

(10) Patent No.: US 6,541,677 B2
(45) Date of Patent: Apr. 1, 2003

(54) PHOTOCHEMICAL SYSTEM AND METHOD FOR THE REMOVAL OF PCDD OR PCDF COMPOUNDS FROM INDUSTRIAL PROCESS EMISSIONS

(75) Inventors: John R. Richards, Durham, NC (US); Daniel M. Richards, Chapel Hill, NC (US); Todd T. Brozell, Raleigh, NC (US); Tommy E. Holder, Cary, NC (US); David G. Goshaw, Cary, NC (US)

(73) Assignee: Air Control Techniques, P.C., Cary, NC (US)

( * ) Notice: Subject to any disclaimer, the term of this patent is extended or adjusted under 35 U.S.C. 154(b) by 0 days.

(21) Appl. No.: 09/847,476

(22) Filed: May 2, 2001

(65) Prior Publication Data

US 2003/0028066 A1 Feb. 6, 2003

(51) Int. Cl.[7] .................. A62D 3/00; C07C 17/00; C07C 1/00
(52) U.S. Cl. .............. 588/210; 204/157.94; 204/157.15
(58) Field of Search ..................... 588/210; 204/157.94, 204/157.15

(56) References Cited

U.S. PATENT DOCUMENTS

| | | | |
|---|---|---|---|
| 3,977,952 A | 8/1976 | Knoevenagel et al. | 204/157.1 R |
| 4,210,503 A | 7/1980 | Confer | 204/158 R |
| 4,981,650 A | 1/1991 | Brown et al. | 422/24 |
| 5,382,736 A * | 1/1995 | Baghel et al. | 585/469 |
| 5,417,825 A | 5/1995 | Graham et al. | 204/158.2 |
| 5,476,975 A | 12/1995 | Ruddick et al. | 568/762 |
| 5,650,549 A * | 7/1997 | Dellinger et al. | 588/227 |
| 6,179,888 B1 * | 1/2001 | Mangiaforte | 55/341.1 |
| 6,179,971 B1 | 1/2001 | Kittrell et al. | 204/158.2 |
| 6,179,972 B1 | 1/2001 | Kittrell et al. | 204/158.2 |
| 6,222,089 B1 * | 4/2001 | Paur et al. | 588/210 |

* cited by examiner

*Primary Examiner*—Edna Wong
(74) *Attorney, Agent, or Firm*—Coates & Bennett, P.L.L.C.

(57) ABSTRACT

A photochemical process for removing or minimizing the concentration of PCDD or PCDF compounds within an industrial gas stream. The process includes the gas phase of PCDD or PCDF compounds. Light within a particular spectral range is irradiated into the gas stream and is absorbed by the PCDD and PCDF compounds in the presence of a free radical hydrogen donor and this results in producing a lower chlorinated PCDD or PCDF compound form. In addition, the gas stream may be treated by removing particular matter therefrom and thereafter subjected to the above-described irradiation. Further, as another optional step, the gas stream may be irradiated with the specific purpose of targeting PCDD and PCDF precursor compounds. In this case, the irradiation is absorbed by the precursor compounds causing them to be chemically modified to different chemical compounds that do not participate in chemical reactions that result in the formation of PCDD and PCDF compounds.

40 Claims, 3 Drawing Sheets

PHOTOCHEMICAL SYSTEM AND METHOD FOR THE REMOVAL OF PCDD OR PCDF COMPOUNDS FROM INDUSTRIAL PROCESS EMISSIONS

BACKGROUND OF THE INVENTION

The present invention relates generally to the field of industrial process emission control, and specifically to a photochemical system and method for removing PCDD-PCDF compounds from the gaseous discharge of various industrial processes.

A wide variety of industrial processes generate, as a byproduct, an output or "effluent" in a gaseous form. Many such effluent streams contain chemicals that are known environmental hazards, are toxic to humans and animals, or both. Economically effective removal of these hazardous materials from industrial process effluent streams is desirable, and additionally is often mandated according to quantified levels by various regulatory agencies.

Particularly hazardous toxic organic compounds are known to exist in low concentrations in the effluent gas streams of a number of industrial processes, such as municipal waste incinerators, medical waste incinerators, and in portland cement plants. These toxic organic compounds are known as polychlorinated dibenzo-p-dioxins and polychlorinated dibenzofurans, more commonly known as dioxins and furans or "PCDD-PCDF compounds." These PCDD-PCDF compounds comprise a family of some 210 similar organic congeners that differ primarily with respect to the extent and position of chlorine substitutions on their aromatic rings. The congeners differ significantly in their toxicity to humans. The congener 2, 3, 7, 8-tetrachforodibenzo-p-dioxin (2, 3, 7, 8 PCDD) is the most toxic of this family, with the congeners having penta- through octa-substituted chlorine atoms exhibiting a lower level of toxicity, and the remaining congeners still less toxic. The PCDD-PCDF compounds are ranked in their toxicity relative to 2, 3, 7, 8-tetrachlorodibenzo-p-dioxin, that is assigned a Toxicity Equivalent Factor (TEF) of 1.0. After many years of research, researchers have determined the relative toxicities for the 210 different compounds that make up the PCDDs and PCDFs with the most toxic 2, 3, 7, 8-tetrachlorodibenzodioxin being assigned a toxic equivalency factor (TEF) of 1.0. The others are assigned values of 0.5, 0.1, 0.05, 0.01, 0.001 or 0.0. To calculate the toxic equivalent quotient, (TEQ), emitted from the source, the measured quantity of each of these compounds is multiplied by its assigned TEF. Then the results are summed to produce a single TEQ value. It is this TEQ value that is used in calculating the health risks associated with the Emission of PCDD and PCDF compounds.

Industrial process effluent streams are regulated with reference to their total TEQ values. Due to the significant toxicity of the PCDD-PCDF compounds, their emissions are strictly limited by the U.S. EPA to Maximum Achievable Control Technology (MACT) standards. Specifically, the regulatory standards for the gaseous effluent from portland cement production facilities is 0.2 nanograms TEQ per cubic meter corrected to 7% oxygen. Typical portland cement pyroprocessing production processes may exhibit a PCDD-PCDF concentration of approximately 0.001 to 5.0 nanograms TEQ per meter cubed corrected to 7.0% oxygen. A reduction of PCDD-PCDF compound concentrations in portland cement pyroprocessing system effluent streams is required for sources emitting more than the allowed limits.

Various approaches to reducing PCDD-PCDF compounds from portland cement pyroprocessing effluent streams are known in the art. For example, it is known to select the raw materials used to prepare the raw feed (primarily comprising limestone, clay, and sand, which furnish the necessary elements calcium, silicon, aluminum, and iron) to have minimum concentrations of organic material. Additionally, it is believed that PCDD-PCDF compound formation from organic compounds is related to gas stream temperature. Consequently, the gaseous effluent stream has been directed through fluid mists and washes, utilizing evaporative cooling to reduce the gas temperatures to below 400° F. However, portland cement plants may operate in an arid environment, wherein water is scarce and expensive, and thus evaporative cooling temperature control is not cost effective. Furthermore, there are cases in which temperature reduction is not sufficient for the suppression of PCDD-PCDF compounds. There are also cases where gas temperature reduction impairs the operation of particulate matter control systems and thereby causes increased emissions of hazardous metals contained in the particulate matter. Hence, there remains a need in the art for a system and method of removing hazardous levels of PCDD-PCDF compounds from industrial process effluent gas streams that can operate at temperatures above 400° F. with little or no evaporative cooling.

SUMMARY OF THE INVENTION

The present invention entails a process of detoxifying PCDD or PCDF compounds within an industrial gas stream. The basic process entails irradiating the industrial gas stream so as to detoxify the PCDD or PCDF compounds therein. Basically, the process of the present invention acts in one of two ways. First, the process entails irradiating the PCDD or PCDF compounds entrained within the gas stream so as to convert the PCDD or PCDF compounds to less toxic compounds. Secondly, the process may irradiate PCDD and/or PCDF precursors and in the process chemically modify those precursor compounds so as to produce different chemical compounds that do not participate in chemical reactions that result in the formation of PCDD and PCDF compounds.

In one particular embodiment of the present invention, the gas stream is treated by removing particulate matter from the gas stream. The treated gas stream is then subjected to irradiation within the spectral range of 290–500 nanometers which results in the production of at least one free radical hydrogen donor that reacts with the PCDD or PCDF compound to yield a lower chlorinated form PCDD or PCDF compound. In this embodiment, the gas stream may be irradiated with light within the spectral range of 250–500 nanometers prior to treatment for the purpose of chemically modifying PCDD or PCDF precursor compounds.

The present photochemical process is applicable to a number of industrial processes, such as waste incinerators and cement plants. In the case of cement plants, the present invention entails irradiating the effluent gas stream that passes from the pyroprocessing system of the cement plant. In this regard, the gas stream is irradiated with light falling within the spectral range of 290–500 nanometers. Preferably in a preferred embodiment, this radiation takes place after the gas stream has been treated by removing particulate matter therefrom. By irradiating the gas stream after treatment, free radical hydrogen donors are generated in the process and the free radical hydrogen donors react with the PCDD or PCDF compounds within the gas stream to yield a less toxic and lower chlorinated PCDD or PCDF compound forms. Further, in this process, additional stages of radiation may be employed. In this regard, prior to removing the particulate matter, the gas stream may be irradiated with light that falls within the spectral range of 250–500 nanometers for the purpose of reacting with and chemically modifying PCDD or PCDF precursor compounds. This irradiation should yield different chemical compounds that do not participate in chemical reactions that result in the formation of PCDD-PCDF compounds.

Other objects and advantages of the present invention will become apparent and obvious from a study of the following description and the accompanying drawings which are merely illustrative of such invention.

DETAILED DESCRIPTION OF THE INVENTION

The present invention relates to a photochemical process aimed at reducing or minimizing the concentration of toxic compounds in an industrial effluent gas stream. In particular, the process of the present invention reduces or minimizes air emissions of a group of organic compounds known as polychlorinated dibenzo-p-dioxins and polychlorinated dibenzofurans. These compounds are commonly referred to as PCDD and PCDF compounds and sometimes may be simply referred to as dioxin and furan compounds. PCDD and PCDF compounds typically exist in very low concentrations in gas streams of various industrial processes, such as, for example, municipal waste incinerators, medical waste incinerators, and cement Manufacturing facilities.

As will be discussed in more detail, the basic photochemical process of the present invention entails irradiating the particulate-laden gas stream at a point where the process effluent gas stream leaves the process equipment and begins to move toward the air pollution control equipment. Irradiation of this particulate-laden gas stream results in the chemical conversion or destruction of PCDD-PCDF precursor gases, including chlorine, chlorophenol compounds, and chlorobenzene compounds. Irradiation of the effluent gas stream exiting the process equipment also results in the destruction of PCDD-PCDF compounds through direct photolytic dechlorination of vapor phase PCDD-PCDF compounds.

Figure 1:
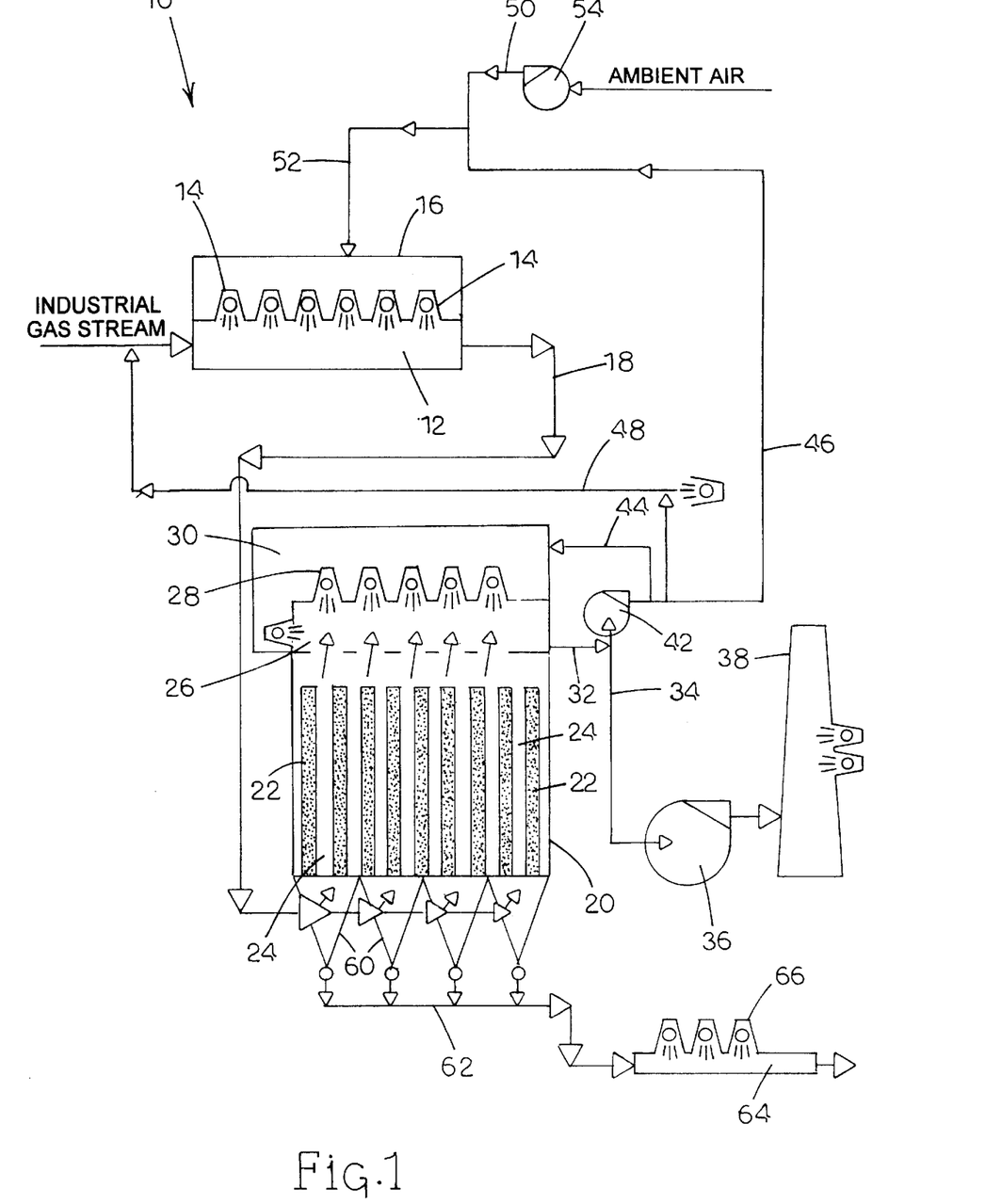
FIG. 1 is a schematic illustration of the photochemical process of the present invention illustrating the removal of PCDD and/or PCDF compounds from an industrial gas stream.

As will be discussed later, one embodiment of the present invention involves irradiation of the gas stream after removal of particulate matter. In this case, the irradiation is limited to light having wavelengths of 290 nanometers or higher and thereby similar to the ultraviolet wavelength limit of sunlight. This irradiation results in the rapid and efficient direct photolytic dechlorination of vapor phase PCDD-PCDF compounds prior to emission to the atmosphere. Turning to FIG. 1, there is shown therein a photochemical system for reducing toxic PCDD and PCDF compounds.

The photochemical system shown therein is indicated generally by the numeral 10. As will become apparent from subsequent discussion, the photochemical system 10 is basically a multi-stage system. In this regard, Stage I of the system comprises a chamber or reactor 12. A series of lights or lamps 14 are mounted in or adjacent to chamber 12. Lights 14 are disposed such that they are operative to radiate light into a gas stream that is passing through or held within the chamber 12. Disposed around the lights 14 is a cooling chamber 16. As will be discussed subsequent herein, ambient air or a recycled portion of the gas stream will be directed through the cooling chamber 16 for the purpose of cooling the lamps 14.

Extending from the chamber 12 is a main connecting duct 18. Duct 18 leads to Stage II of the photochemical system 10. Stage II of the photochemical system 10 includes a filter room or filter chamber 20. Disposed within the filter room 20 is a series of filter bags 22. It should be appreciated that the filtration function performed within the filter room 20 can be carried out with various types of high efficiency particulate matter removal devices, including, for example, electrostatic precipators, reverse gas fabric filters, and pulse jet fabric filter. In the case of the present embodiment, it is contemplated that the filter bags 22 would comprise elongated fabric filter bags with each filter bag including a gas inlet formed about the lower portion of each of the filter bags. Disposed between the respective filter bags 22 are air spaces 24. As will be appreciated, the gas stream entering the filter room 20 will be directed into and through the filter bags 22. The gas stream will effectively exit the respective filter bags 22 along their lengths and thus the filtered gas stream will move generally upwardly through the spaces 24 between the respective filter bags 22.

Disposed over the filter bags 22 is a chamber or reactor 26. Chamber or reactor 26 includes openings for receiving the filtered gas stream exiting the filter bags 22. Further, mounted adjacent the top of chamber 26 is a series of lights or lamps 28. Lights 28 are mounted so as to direct radiation therefrom into the chamber 26 thereby exposing the filtered gas stream therein to the light. Formed adjacent the chamber 26 and generally surrounding the lights 28 is a second cooling chamber 30. Like the first cooling chambers 16, the second cooling chamber 30 functions to receive ambient air or portions of the recycled gas stream for the purpose of cooling the individual lights 28 housed within the cooling chamber 30.

Connected to the chamber 26 is an outlet duct 32 which joins or connects to an intermediate duct 34. As seen in FIG. 1, the intermediate duct 34 is connected to a fan 36 which is operative to expel and direct the filtered gas stream from duct 34 into a stack 38. As an option, there is provided a series of lights operating in a spectral range above 290 nanometers, a value that matches the near ultraviolet wavelength limit of sunlight. This stack mounted lights accelerate the photolytic dechlorination of PCDD-PCDF compounds that occurs naturally due to sunlight when the gas stream is expelled from the stack.

Referring back to the intermediate duct 34, it is seen that the same is connected to a fan 42. The fan 42 is in turn operative to feed two cooling ducts, ducts 44 and 46. Note that cooling duct 44 returns to the cooling chamber 30 that surrounds the lights 28 that form a part of Stage II treatment. Cooling duct 46 on the other hand is operative to direct a portion of the filtered gas stream to duct 52 which in turn is connected to the cooling chamber 16 that surrounds the lights 14. Also it is noted that ambient air can also be used for cooling and in the case of the system shown in FIG. 1 a fan 54 is utilized to direct ambient air into a duct 50 which is connected with duct 52.

To increase the overall efficiency of reducing PCDD and PCDF compounds, the present process envisions that a portion of the gas stream discharged from reactor 26 can be recycled via duct 48 to Stage I. More particularly, the filtered gas stream being recycled through duct 48 is fed into the inlet side of chamber or reactor 12. Thus, it is appreciated that PCDD and PCDF precursor compounds that were not broken down during a preceding treatment in Stage I may be effectively treated during subsequent runs through Stage I treatment. In addition, by recycling a portion of the gas stream, PCDD and PCDF compounds not completely converted to non-toxic compounds in prior runs through Stage II will be exposed again to Stage II treatment. Consequently, it follows that the continuous recycling of portions of the gas stream discharged from reactor 26 has the capability of more efficiently reducing or minimizing the PCDD and PCDF compounds within the gas stream ultimately directed to the atmosphere.

Figure 1A:
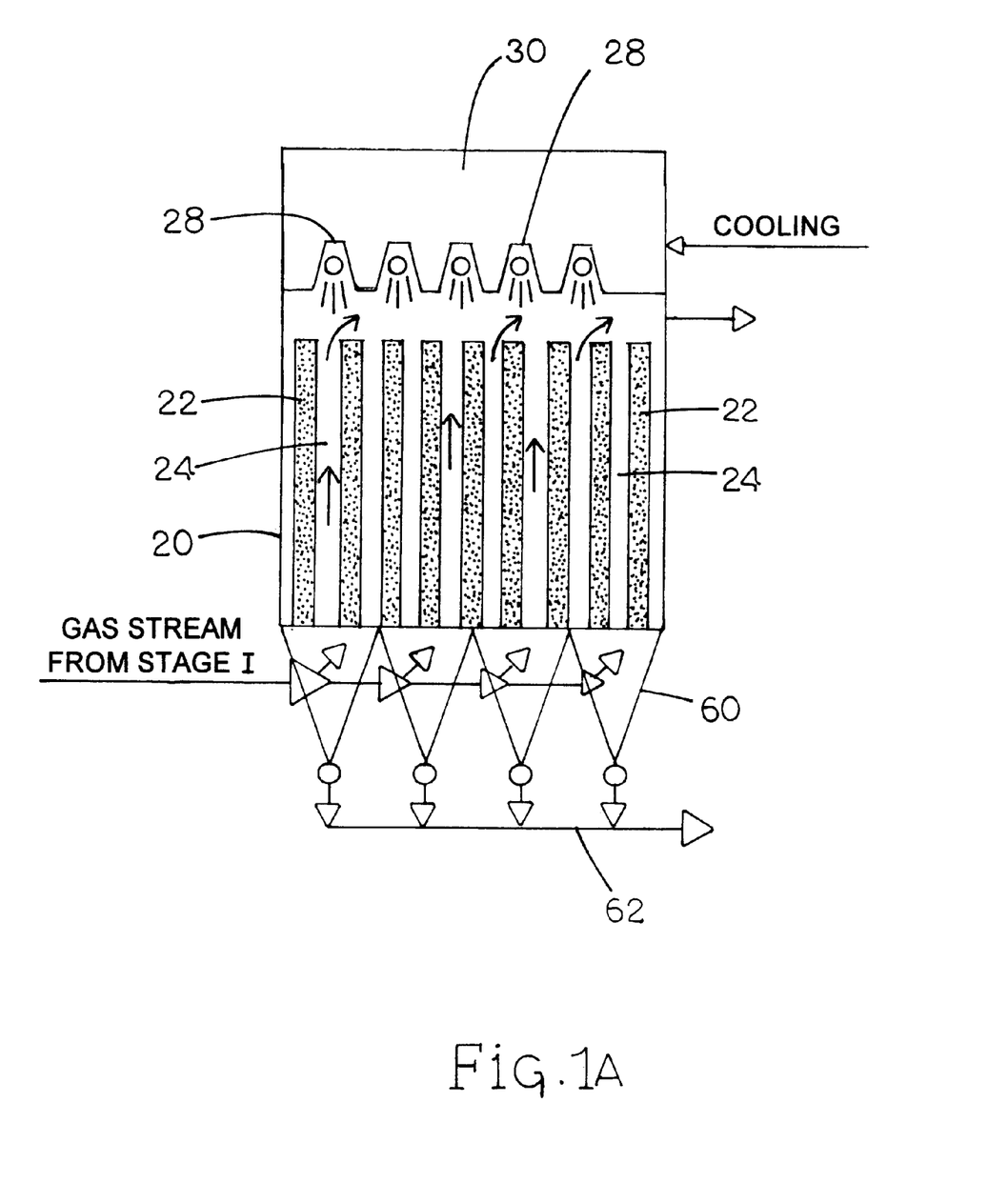
FIG. 1A is a schematic illustration showing an alternate arrangement for the filter room and the lights utilized to irradiate the filtered gas stream.

FIG. 1A depicts an alternative manner of irradiating the gas stream after the particulate matter has been removed. In this case, the lights 28 are disposed directly over the filters 22. This is to be contrasted with the Stage II treatment of FIG. 1 where the gas stream after being filtered is directed into chamber 26 where it is subjected to irradiation. In any event, the alternate method or process of FIG. 1A entails positioning the lights 28 above the upper terminal ends of the filters 22 and aligning the lights 28 such that they are directed downwardly towards the open spaces 24 formed between the respective filters 22. Thus, as the gas stream exits the filters 22 and moves upwardly through the spaces 24, it is appreciated that the downwardly projecting irradiation from lights 28 will, in an efficient manner, contact the filtered gas stream. In addition, once the gas stream clears the upper terminal portions of the filters 22, the gas stream will turn and move towards an outlet in the upper portion of the filter room 20. As the gas stream turns and moves underneath the array of lamps 28, the gas stream will be further subjected to irradiation from the lights 28.

Further, the photochemical system of the present invention may entail provisions for dealing with the particulate matter captured by the filter bags 22. In this regard, the captured particulate matter can be directed from the bags into hoppers 60 underlying the bottom or floor level of the filter room 20. Once in the hoppers 60, the particulate matter can be dispensed onto a conveyor system 62 which will direct the particulate matter to Stage III processing. During Stage III processing the particulate matter will be directed into and through a chamber or reactor 64. Associated with the reactor 64 is a series of lights 66 that can be utilized to photochemically treat the recovered particulate matter. It is contemplated that the light emitted in Stage II processing would fall within the spectral range of 290–500 nanometers. It should be noted that Stage III treatment and particularly the irradiation of the removed particulate matter is optional and may not form a part of the photochemical process of the present invention.

In accordance with the method or process of the present invention, an industrial gas stream is directed into chamber 12. In practice, the temperature of the gas stream passing through chamber 12 would typically range from 400° F. to 1,000° F. Preferably, the temperature within Stage I of the process or of the gas stream passing through chamber 12 would be maintained within the range of approximately 400–800° F. Here the photochemical process is designed to destroy or chemically modify some of the chemical compounds that act as precursors for the formation of PCDD and PCDF compounds. It is contemplated that the lights 14 utilized in Stage I of the process and particularly employed in connection with chamber 12 would radiate light within a spectral range of 250–500 nanometers. This would entail both ultraviolet light and visible light, with ultraviolet light being deemed to be within the spectral range of 250–400 nanometers and visible light being deemed to fall within the spectral range of 400–500 nanometers. The number of lights 14 used in Stage I of the process would vary depending upon the flow rate of the gas stream through the chamber 12, the chemical make-up of the gas stream, and other factors. However, it is contemplated that the lamps or lights 14 would be selected so as to provide an intensity of 200 to 2000 microwatts per square centimeter measured at 254 nanometers and 1000 to 20000 microwatts per square centimeter measured at 360 nanometers and thereby result in light absorption levels of 0.1 to 10 microwatts per actual cubic foot of gas treated. It may be important to limit the light intensity to avoid the formation of photochemical free radical reaction byproducts.

The light emitted by the lamps 14 in Stage I of the process is absorbed by PCDD and PCDF precursor compounds such as chlorine gas, chlorophenol compounds, and other organic precursors. The residency time in Chamber 12 could vary, but under normal conditions, one would expect the residency time of the gas stream in Chamber 12 to be approximately 0.1 to 2.0 seconds. It may be desirable to limit the residence time in the irradiation chamber to avoid the formation of photochemical free radical reaction by products. It is postulated that under some conditions, the chlorine gas is converted to hydrogen chloride and the organic compounds are converted to chemical forms that do not subsequently react to form PCDD or PCDF compounds. Irradiation in Stage I also results in the detoxification of already formed PCDD and PCDF compounds. Detoxification of PCDD and PCDF compounds occurs due to the direct photolytic dechlorination of PCDD and PCDF in the presence of free radical hydrogen donors.

The reactions involved in Stage I are summarized below. The photochemically initiated reactions responsible for the destruction of chlorine gas involves the disassociation of the diatomic chlorine molecule into two chlorine atoms as indicated in reaction 1. The chlorine atoms react with water vapor or other hydrogen-containing compounds to form hydrogen chloride as shown in reaction 2. Once present in the gas stream as hydrogen chloride, the chloride ion is not active in the formation of PCDD-PCDF compounds.

| STAGE 1 REACTIONS | |
|---|---|
| Chlorine Photolysis | |
| $CL_2 + h\nu$ (250–310 nm) $\rightarrow$ 2Cl | Reaction 1 |
| $Cl + H_2O \rightarrow HCl + OH$ | Reaction 2 |
| Nitrogen Oxides Photolysis | |
| $NO_2 + h\nu$ (270–430 nm) $\rightarrow O(^3P) + NO$ | Reaction 3 |
| $O(^3P) + O_2 \rightarrow O_3$ | Reaction 4 |
| $O_3 + NO \rightarrow O_2 + NO_2$ | Reaction 5 |
| Ozone Photolysis | |
| $O_3 + h\nu$ (250–306 nm) $\rightarrow O(^1D) + O_2\ (^1\Delta_g)$ | Reaction 6 |
| $O_3 + h\nu$ (306–350 nm) $\rightarrow O(^1D) + O_2\ (^3\Sigma_g^-)$ | Reaction 7 |
| $O_3 + h\nu$ (450–700 nm) $\rightarrow O(^3P) + O_2\ (^1\Delta_g,\ \text{and}\ ^3\Sigma_g^-)$ | Reaction 8 |

STAGE 1 REACTIONS -continued

Excited Oxygen Reactions

| | |
|---|---|
| $O(^1D) + H_2O \rightarrow 2HO$ | Reaction 9 |
| $O(^1D) + H_2O \rightarrow O(^3P) + H_2O$ | Reaction 10 |

Nitrogen Oxides and Hydrogen Peroxide Photolysis

| | |
|---|---|
| $N_2O_4 + hv\ (250-310\ nm) \rightarrow NO + NO_2 + O(^3P)$ | Reaction 11 |
| $HNO_2 + hv(<400\ nm) \rightarrow HO + NO$ | Reaction 12 |
| $HNO_3 + hv(<330\ nm) \rightarrow HO + NO_2$ | Reaction 13 |
| $H_2O_2 + hv(<370\ nm). \rightarrow 2HO$ | Reaction 14 |

Nitrogen Oxide Reactions

| | |
|---|---|
| $2\ NO + O_2 \rightarrow 2\ NO_2$ | Reaction 15 |
| $NO_2 + NO + H_2O \rightarrow 2\ HNO_2$ | Reaction 16 |
| $2HNO_2 \rightarrow NO_2 + NO + H_2O$ | Reaction 17 |
| $HO + NO_2\ (+M) \rightarrow HONO_2\ (+M)$ | Reaction 18 |
| $HO + NO + M \rightarrow HNO_2 + M$ | Reaction 19 |
| $HO + HO \rightarrow H_2O_2$ | Reaction 20 |

Carbon Monoxide Chain Reactions

| | |
|---|---|
| $HO + CO \rightarrow H + CO_2$ | Reaction 21 |
| $H + O_2 -+ M \rightarrow HO_2 + M$ | Reaction 22 |
| $HO_2 + NO \rightarrow HO + NO_2$ | Reaction 23 |

Organic Compound Reactions

| | |
|---|---|
| $O_3 + RHC=CHR \rightarrow RHC-OOO-CHR$ (C-to-C bond) $\rightarrow RCHO_2 + RCHO$ | Reaction 24<br>Reaction 25 |
| $RO_2 + NO \rightarrow RO + NO_2$ | Reaction 26 |
| $R + O_2(+M) \rightarrow RO_2\ (+M)$ | Reaction 27 |
| $HO + RH \rightarrow H_2O + R$ | Reaction 28 |
| RCl (chlorobenzene and chlorophenol compounds) + hv (250–350 nm) $\rightarrow$ R + Cl | Reaction 29 |
| 2,3,7,8 TCDD (hv 250–350 nm) + RH $\rightarrow$ R + Trichlorinated Dibenzo-p-Dioxin + HCl | Reaction 30 |
| 2,3,7,8 TCDF TCDD (hv 250–350 nm) + RH $\rightarrow$ R + Trichlorinated Dibenzofurans + HCl | Reaction 31 |
| 1,2,3,7,8 PeCDF- TCDD (hv 250–350 nm) -+ RH $\rightarrow$ R + Tetrachlorinated Dibenzofurans + HCl | Reaction 32 |

Chlorophenol compounds, chlorobenzene compounds, and other organic precursors are partially destroyed due to reactions with hydroxy, hydroperoxy, and alklyperoxy radicals generated, by the photochemically initiated set of reactions summarized in reactions 3 through 28. PCDD and PCDF compounds are photolytically dechlorinated due to the absorption of ultraviolet light in the spectral range of 250 to 400 nm as illustrated in reactions 29 to 32. PCDD and PCDF compounds are also dechlorinated due to the reactions of hydroxy, hydroxyperoxy, and alklyperoxy radicals generated by photochemical initiated reactions 3 through 28. It is believed that such PCDD and PCDF compounds that are dechlorinated form compounds that are considered non-toxic at the part per billion and part per trillion (volume basis) concentrations that would be typically generated.

In Stage II of the photochemical process, the lights 28 that treat the filtered gas stream that passes through chamber 26 are adapted to emit light within the spectral range of 290 to 500 nanometers. It is further contemplated that the most efficient spectral range for the lights 28 would be 290 to 400 nanometers. It is contemplated that the lamps or lights 28 would be selected so as to provide an intensity of 200 to 1000 microwatts per square centimeter measured at 254 nm and 500 to 10000 microwatts per square centimeter measured at 360 nm and thereby result in light absorption levels of 0.05 to 5 microwatts per actual cubic foot of gas treated. Further, it is contemplated that the residency time of the filtered gas stream within chamber 26 would be approximately 2 to 12 seconds. It is desirable to limit the light intensities and gas residence times in the irradiation to minimize the formation of photochemical free radical reaction by products. The temperature of the gas stream passing through Stage II and chamber 26 would typically range from approximately 300–550° F. Preferably the temperature would be expected to be approximately 400–500° F. It should be noted that the temperature ranges discussed for both Stage I and Stage II may vary and different temperatures may be effective and even preferable depending upon the makeup and nature of the gas stream and other factors.

As noted above, the gas stream being treated in chamber 26 is a filtered gas stream, the filtration being accomplished by the series of bag filters of 22 disposed within the filter room 20. While the primary function of the filter system is to remove filterable particulate matter, the filter system also provides for the high efficiency collection of reaction products of the photochemical process, most of which are present as heterogeneously condensed phase material. Also, during movement through the filter bags 22, there is also some vapor phase mass transfer to the particulate laden dust cake.

In Stage II the PCDD and PCDF compounds in the filtered gas stream absorb light emitted by the lamps 28. This photochemical process gives rise to the presence of free radical hydrogen donors which facilitate the dechlorination of the PCDD or PCDF compounds. For example, the most toxic of the PCDD compounds is 2, 3, 7, 8 tetrachlorodibenzo-p-dioxin. When this compound is exposed to light within the spectral range of 290–400 nanometers, for example, it is contemplated that a hydrogen atom from a free radical hydrogen donor will be substituted from one of the chlorine atoms of the 2, 3, 7, 8 tetrachlorodibenzo-p-dioxin, resulting in the formation of a trichlorinated dibenzo-p-dioxin compound that is vastly less toxic than the 2, 3, 7, 8 tetrachlorodibenzo-p-dioxin compound.

There are many potential photochemical reactions initiated in Stage II. Listed below are examples of some of these reactions.

STAGE II REACTIONS

Photostationary State and $NO_2$ Photolysis

| | |
|---|---|
| $NO_2 + hv\ (250-430\ nm) \rightarrow O(^3P) + NO$ | Reaction 3 |
| $O(^3P) + O_2 \rightarrow O_3$ | Reaction 4 |
| $O_3 + NO \rightarrow O_2 + NO_2$ | Reaction 5 |

Ozone Photolysis

| | |
|---|---|
| $O_3 + hv\ (250-306\ nm) \rightarrow O(^1D) + O_2\ (^1\Delta_g)$ | Reaction 6 |
| $O_3 + hv\ (306-350\ nm) \rightarrow O(^1D) + O_2\ (^3\Sigma_g^-)$ | Reaction 7 |
| $O_3 + hv\ (450-700\ nm) \rightarrow O(^3P) + O_2\ (^1\Delta_g, \text{and}\ ^3\Sigma_g^-)$ | Reaction 8 |

Excited Oxygen Reactions

| | |
|---|---|
| $O(^1D) + H_2O \rightarrow 2HO$ | Reaction 9 |
| $O(^1D) + H_2O \rightarrow O(^3P) + H_2O$ | Reaction 10 |

Nitrogen Oxides and Hydrogen Peroxide Photolysis

| | |
|---|---|
| $N_2O_4 + hv\ (250-310\ nm) \rightarrow NO + NO_2 + O(^3P)$ | Reaction 11 |
| $HNO_2 + hv(<400\ nm) \rightarrow HO + NO$ | Reaction 12 |
| $HNO_3 + hv(<330\ nm) \rightarrow HO + NO_2$ | Reaction 13 |
| $H_2O_2 + hv(<370\ nm) \rightarrow 2HO$ | Reaction 14 |

Nitrogen Oxide Reactions

| | |
|---|---|
| $2\ NO + O_2 \rightarrow 2\ NO_2$ | Reaction 15 |
| $NO_2 + NO + H_2O \rightarrow 2\ HNO_2$ | Reaction 16 |
| $2HNO_2 \rightarrow NO_2 + NO + H_2O$ | Reaction 17 |
| $HO + NO_2\ (+M) \rightarrow HONO_2\ (+M)$ | Reaction 18 |
| $HO + NO + M \rightarrow HNO_2 + M$ | Reaction 19 |
| $HO + HO \rightarrow H_2O_2$ | Reaction 20 |

Carbon Monoxide Chain Reactions

| | |
|---|---|
| $HO + CO \rightarrow H + CO_2$ | Reaction 21 |

-continued

STAGE II REACTIONS

| | |
|---|---|
| $H + O_2 \rightarrow + M \rightarrow HO_2 + M$ | Reaction 22 |
| $HO_2 + NO \rightarrow HO + NO_2$ | Reaction 23 |
| Organic Compound Reactions | |
| $O_3 + RHC=CHR \rightarrow RHC-OOO-CHR$ (C-to-C bond) $\rightarrow RCHO_2 + RCHO$ | Reaction 24 Reaction 25 |
| $RO_2 + NO \rightarrow RO + NO_2$ | Reaction 26 |
| $R + O_2 (+M) \rightarrow RO_2 (+M)$ | Reaction 27 |
| $HO + RH \rightarrow H_2O + R$ | Reaction 28 |
| PCDD and PDCF Reactions (Examples) | |
| RCl (chlorobenzene and chlorophenol compounds) + hv (250–350 nm) $\rightarrow$ R + Cl | Reaction 29 |
| 2,3,7,8 TCDD (hv 250–350 nm) + RH $\rightarrow$ R + Trichlorinated Dibenzo-p-Dioxin + HCl | Reaction 30 |
| 2,3,7,8 TCDF TCDD (hv 250–350 nm) + RH $\rightarrow$ R + Trichlorinated Dibenzofurans + HCl | Reaction 31 |
| 1,2,3,7,8 PeCDF- TCDD (hv 250–350 nm) –+ RH $\rightarrow$ R + Tetrachlorinated Dibenzofurans + HCl | Reaction 32 |
| $HO_2$ + 2,3,7,8 TCDD (hv 250–350 nm) $\rightarrow$ HO + Trichlorinated Dibenzo-p-Dioxin + HCl | Reaction 33 |
| $HO_2$ + 2,3,7,8 TCDF TCDD (hv 250–350 nm) $\rightarrow$ HO + Trichlorinated Dibenzofurans + HCl | Reaction 34 |
| $HO_2$ + 1,2,3,7,8 PeCDF- TCDD (hv 250–350 nm) $\rightarrow$ HO + Tetrachlorinated Dibenzofurans + HCl | Reaction 35 |
| $RO_2$ + 2,3,7,8 TCDD- TCDD (hv 250–350 nm) $\rightarrow$ RO + Trichlorinated Dibenzo-p-Dioxin + HCl | Reaction 36 |
| $RO_2$ + 2,3,7,8 TCDF- TCDD (hv 250–350 nm) $\rightarrow$ RO + Trichlorinated Dibenzofurans + HCl | Reaction 37 |
| $RO_2$ + 1,2,3,7,8 PeCDF- TCDD (hv 250–350 nm) $\rightarrow$ RO + Tetrachlorinated Dibenzofurans + HCl | Reaction 38 |
| HO + 2,3,7,8 TCDD- TCDD (hv 250–350 nm) $\rightarrow$ H + Trichlorinated Dibenzo-p-Dioxin + HCl | Reaction 39 |
| HO + 2,3,7,8 TCDF- TCDD (hv 250–350 mn) $\rightarrow$ H + Trichlorinated Dibenzofurans + HCl | Reaction 40 |
| HO + 1,2,3,7,8 PeCDF- TCDD (hv 250–350 nm) $\rightarrow$ H + Tetrachlorinated Dibenzofurans + HCl | Reaction 41 |

Note:
$HO_2$, HO, R, $RO_2$, and O are free radicals

In Stage II the PCDD and PCDF compounds in the filtered gas stream absorb light emitted by the lamps 28. This photochemical process results in the direct photolytic dechlorination of PCDD and PCDF compounds by means of reactions 30, 31 and 32 and dechlorination due to reactions with photochemically generated free radicals as illustrated in reactions 33 through 41. All of these reactions lead to the formation of compounds that are non-toxic or less toxic than the PCDD and PCDF compounds. The irradiation of the effluent from the filter bags 22 or a high efficiency particulate matter control system results in the photochemically initiated destruction or breakdown of vapor phase PCDD-PCDF compounds. These vapor-phase PCDD-PCDF compounds have survived Stage I treatment or have been formed after the gas stream has passed through the Stage I irradiation area. The high efficiency particulate matter control system as exemplified by the filter bags 24 is effective in enhancing the efficiency of Stage II irradiation. This is because particulate matter that tends to absorb and scatter light has been reduced in concentration by a factor of approximately 99% to 99.5% as discussed above.

Reducing PCDD and PCDF Compounds in a Gas Stream Produced by a Cement Manufacturing Facility The process described above for reducing or minimizing PCDD and PCDF compounds in an industrial gas stream can be applied to many industrial processes. One particular application of the present process and system is to cement manufacturing facilities that, in some case, have a tendency to produce, in very low concentrations, PCDD and PCDF compounds.

Figure 2:
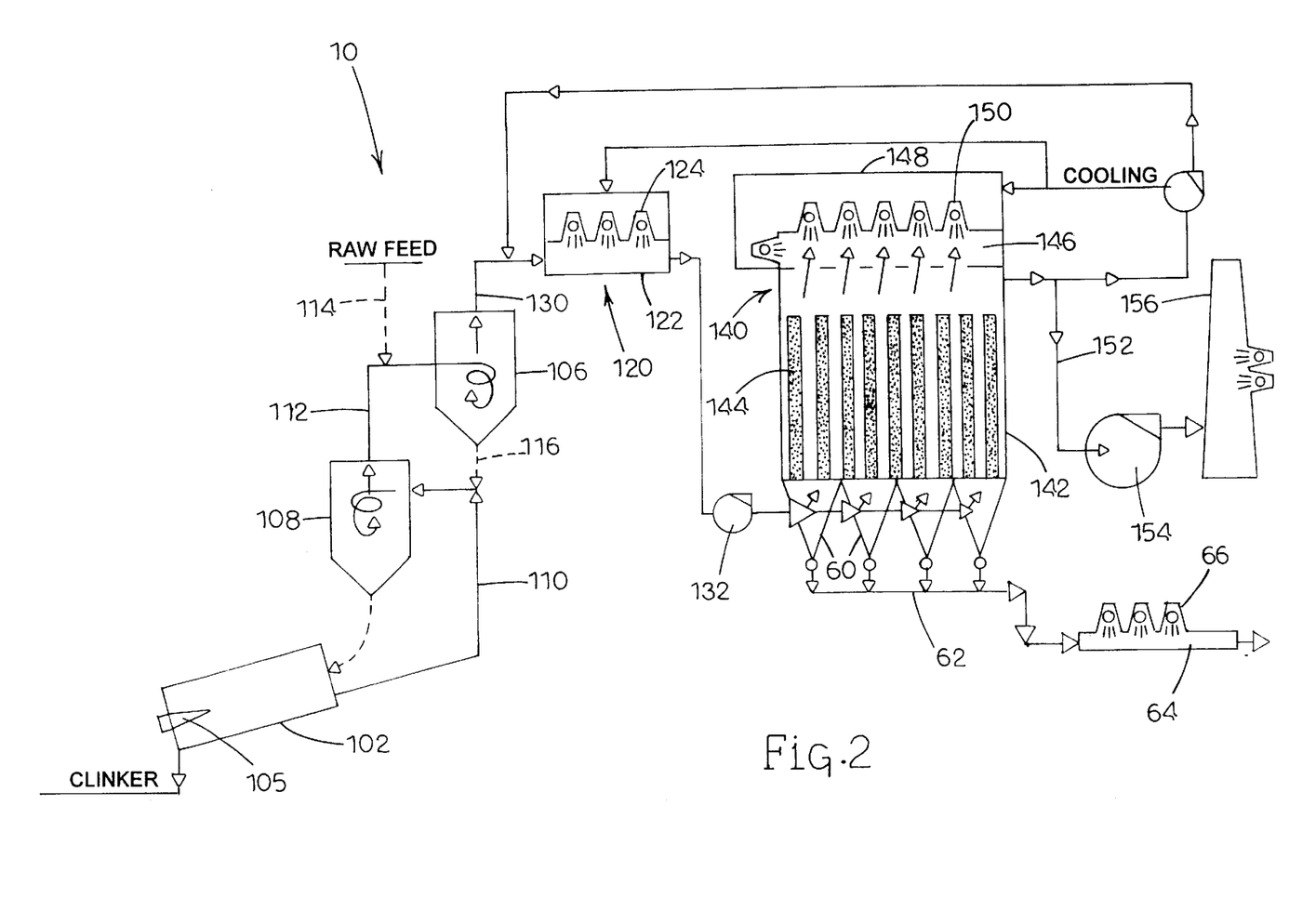
FIG. 2 is a schematic illustration of a portland cement plant incorporating a photochemical process for reducing the concentration of PCDD and/or PCDF compounds in an effluent gas stream associated with the manufacturer of portland cement.

Before discussing the particular process of reducing or minimizing PCDD and PCDF compounds in a gas stream produced by a cement manufacturing facility, it may be helpful to briefly review the components of a cement or portland cement manufacturing facility. In this regard, FIG. 2 is schematic illustration of a typical cement plant and indicated generally by the numeral 100 (not shown). Details of the cement manufacturing facility 10 are not dealt with here in detail because such is not per so material to the present invention and further basic structures and processes involved in manufacturing cement is well-known. However, a brief review of the schematic illustration of FIG. 2 is in order.

In that regard, the cement manufacturing facility 10 comprises a pyroprocessing system. In the case of the embodiment illustrated herein, the pyroprocessing system includes a rotary kiln 102 having a burner 105 disposed in the outlet end thereof, and a preheater tower. The preheater tower includes a series of cyclones 106 and 108.

In conventional fashion, a gas stream is generated in the kiln 102. The gas stream moves from the kiln 102 through a gas duct 110 to the lower cyclone 108. Gas entering cyclone 108 may be directed through portions of the cyclone and ultimately will exit cyclone 108 via duct 112. Duct 112 leads to the second cyclone, cyclone 106. The gas stream will enter cyclone 106 via duct 112 and again will in conventional fashion be directed to various areas within the cyclone. Ultimately, the gas stream will exit cyclone 106 and enter main duct 130 that leads from cyclone 106 to a fan 132.

Cyclones 106 and 108 are adapted to receive a conventional raw feed, typically limestone and in some cases additives such as clay and sand. The raw feed is typically directed through a feed line 114 into duct 112 carrying the gas stream from cyclone 108 to cyclone 106. The raw feed entering duct 112 will mix with the gas stream and be directed into cyclone 106. There the raw feed will gravitate downwardly through cyclone 106 and be subjected to preheating therein. The raw feed will exit cyclone 106 through feed line 116. As noted in the schematic of FIG. 2, feed line 116 joins the gas stream duct 110. There the raw feed will mix with the gas stream traveling in duct 110 and be directed into the lower cyclone, cyclone 108. Once in Cyclone 108, the raw feed will gravitate downwardly through the cyclone and in the process will be preheated therein. Ultimately, the preheated raw feed will exit cyclone 108 into feed line 118 (not shown) which carries the preheated raw feed to kiln 102. In kiln 102, the raw feed will be subjected to beating in the range of 2,800° F. and during this course there will be produced cement clinker that will be directed out the output end of kiln 102. It is appreciated that the basic structure of the cement manufacture plant can vary. For example, there can be any number of cyclones that form a part of the pyroprocessing system of a cement plant. In addition, and in the way of an example, some cement manufacturing plants do not include preheaters. Accordingly, the illustration discussed above and shown in FIG. 2 is principally for explanation purposes.

The gas stream exiting cyclone 106 is directed into duct structure 130 that leads from the cyclone 106 to a fan 132. At some point in the duct structure 130, preferably adjacent cyclone 106, there is provided the Stage I photochemical treatment site which is indicated generally by the numeral 120. The photochemical process carried out here is essentially the same process carried out in the Stage I process discussed above with respect to FIG. 1. In any event, the Stage I of treatment site includes a chamber 122 that is provided with a series of lights or lamps 124. As discussed with respect to the Stage I treatment for the process depicted in FIG. 1, the lamps or lights 124 could be housed at least partially within a cooling chamber such that the individual lamps could be continuously cooled during the process.

Fan 132 is operative to direct the gas stream, after being subjected to Stage I treatment, to a Stage II treatment site that is indicated generally by the numeral 140. Stage II treatment is comparable to the Stage II treatment discussed with respect to the process shown in FIG. 1. Again, Stage II treatment entails filtering the particulate matter from the gas stream and then subjecting the filtered gas stream to irradiation which in this case is contemplated to be within a spectral range of 290–500 nanometers, and preferably within a spectral range of 290–400 nanometers. In any event, as illustrated in FIG. 2, the Stage II treatment site comprises a filter room 142 having a series of elongated filter bags 144 disposed therein. Disposed over the filter bags 144 is a treatment chamber 146 and a cooling chamber 148. Lights or lamps 150 are disposed within the cooling chamber 148 and are directed downwardly into the chamber 146 for treating the filtered gas stream exiting the respective filter bags 144.

The treated gas stream exits chamber 146 and is directed through a discharge duct 152 to a fan 154. Fan 154 directs the filtered and treated gas stream to a stack 156 which directs the filtered and treated gas stream to the atmosphere. As an option, lights or lamps, as suggested in the process of FIG. 1, can be installed in the stack 156 and adapted to emit light in the spectral range of 290 to 500 nanometers for further treating the gas stream passing through the stack.

The Stage I and Stage II treatment sites in the cement plant 100 function in the same manner as the Stage I and Stage II treatment sites discussed with respect to the process shown in FIG. 1. Again in Stage I, the lamps 124 would preferably emit light within the spectral range of 250 to 500 nanometers. While the intensity of the lamps and the residency time of the gas stream within chamber 122 may vary depending upon the nature of the gas stream and other circumstances, it contemplated that the light intensity would be 200 to 2000 microwatts per square centimeter measured at 254 nm and 1000 to 20000 microwatts per square centimeter measured at 360 nm and thereby result in light absorption levels of 0.1 to 10 microwatts per actual cubic foot of gas treated. The residency time of the gas stream within chamber 122 would be approximately 0.1 to 2 seconds. Again the purpose of Stage I treatment is to destroy or chemically modify compounds that are precursors to the formation of PCDD and PCDF compounds. It is believe that the treatment of the gas stream being emitted by the cyclone preheater 106 with light in the spectral range of 250 to 500 nanometers will effectively convert such precursor compounds such as chlorine, chlorophenol compounds, and chlorobenzene compounds to hydrogen chloride to other organic compounds that do not contribute to the formation of PCDD and PCDF compounds. Furthermore, irradiation of the gas stream in Stage I will result in the dechlorination of PCDD and PCDF compounds due to direct photolysis and due to reactions of PCDD and PCDF compounds with photochemically generated free radical species.

As discussed beforehand, in Stage II, it is contemplated that after filtering the gas stream and exposing the PCDD and PCDF compounds within the filtered gas stream to light within the spectral range of 250–400 nanometers in the presence of at least one free radical hydrogen donor, such will result in the dechlorination of a substantial concentration of PCDD and PCDF compounds. The intensity of light 150 and the residency time of the gas stream in chamber 146 is contemplated to be comparable to the Stage II process discussed above with respect to the method illustrated in FIG. 1. In that regard, lights 150 would be selected to provide an intensity of 200 to 1,000 microwatts per square centimeter measured at 254 nanometers and 500 to 10,000 microwatts per square centimeter measured at 360 nanometers and thereby result in a light absorption level of 0.05 to 5 microwatts per actual cubic foot of gas treated. Also, it is contemplated that the residency time of the filtered gas within chamber 146 would be approximately 2 to 12 seconds.

Photochemical processes are, of course, known. For a more complete and unified understanding of photochemistry and its applications, one is referred to the following references:

(1) U.S. Pat. No. 5,476,975; (2) U.S. Pat. No. 4,981,650; (3) U.S. Pat. No. 4,210,503; (4) U.S. Pat. No. 3,977,952; (5) U.S. Pat. No. 5,417,825; (6) U.S. Pat. No. 6,179,971; (7) U.S. Pat. No. 6,179,972; (8) *Accidental Exposure to Dioxin Human Health Aspects*, Frederick Coulston and Francesco Pocchiari (1983); and (9) *Dioxin Toxicological and Chemical Aspects*, Volume I, Flaminio Cattabeni, et.al. (1978). All of the above U.S. patents and references are expressly herein incorporated by reference.

From the foregoing discussion, it is appreciated that the present invention presents an effective photochemical process for reducing or minimizing toxic PCDD and PCDF compounds in an industrial gas stream. Essentially, the photochemical process entails the direct photolysis of PCDD and PCDF compounds in the presence of at least one free radical hydrogen donor which results in the dechlorination of the PCDD and PCDF compounds which in turn results in a less toxic polychlorinated dibenzodioxin or polychlorinated dibenzofuran compounds. Further, the present photochemical process may act on PCDD and PCDF precursor compounds. The irradiation of such precursor compounds can chemically modify the compounds to yield different chemical compounds that do not participate in chemical reactions that result in the formation of PCDD and PCDF compounds.

The photochemical process of the present invention is designed to operate in a high particulate matter concentration gas stream and does not rely on the use of photocatalysts, and does not use ionizing radiation or electron beams.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of converting polychlorinated dibenzo-p-dioxins (PCDD) or polychlorinated dibenzofurans (PCDF) compounds in an industrial gas stream to less hazardous chemical forms comprising: removing particulate matter from the gas stream, and irradiating the gas stream and the PCDD or PCDF compounds therein with light to generate one or more free radical hydrogen donors to dechlorinate the PCDD or PCDF compounds to less hazardous chemical forms.

2. The method of claim 1 including irradiating the gas stream with light falling within the spectral range of 290–500 nanometers.

3. The method of claim 1 wherein removing particulate matter from the gas stream includes directing the gas stream through a series of spaced-apart elongated filters wherein the filtered gas stream is emitted along the length of the elongated filters, and wherein the irradiation of the filtered gas stream includes irradiating the areas between the filters.

4. The method of claim 3 wherein the filters are vertically oriented and the filtered gas stream tends to move upwardly through the areas between the filters, and wherein the filtered gas stream is irradiated as it moves upwardly through the areas between the filters.

5. The method of claim 4 including irradiating the gas stream, prior to filtering, with light falling within the spectral range of 250–500 nanometers.

6. The method of claim 4 including recycling a portion of the filtered gas stream such that the recycled portion is subjected to further irradiation.

7. The method of claim 1 wherein removing particulate matter from the gas stream includes directing the gas stream through a series of electrostatic precipitation fields.

8. The method of claim 1 including subjecting the removed particulate to light that falls within a spectral range of 290–400 nanometers.

9. The method of claim 1 including directing the gas stream into the inlet ends of a series of spaced-apart elongated filters housed within a chamber wherein the gas stream exits the filters along their length and moves therefrom toward at least one outlet in the chamber; and wherein lamps are disposed within the chamber and are oriented to emit light into open areas defined between the filters such that the light may contact the PCDD or PCDF compounds within the filtered gas stream as the filtered gas stream moves between the series of filters.

10. The method of claim 1 wherein prior to removing particulate matter from the gas stream, irradiating the gas stream with light so as to reduce a concentration of PCDD or PCDF precursor compounds in the gas stream and to detoxify the PCDD or PCDF compounds by direct photolysis.

11. The method of claim 10 wherein the precursor compounds irradiated are selected from the group consisting of chlorine gas, chlorophenol compounds, and chlorobenzene compounds.

12. The method claim 10 wherein the irradiation of the precursor compounds converts the precursor compounds into hydrogen chloride and other organic compounds that do not contribute to the formation of the PCDD or PCDF compounds.

13. The method of claim 1 wherein converting the PCDD or PCDF compounds to less hazardous chemical forms includes dechlorinating the PCDD and PCDF compounds by reacting to the one or more free radical hydrogen donors with the PCDD or PCDF compounds.

14. The method of claim 13 wherein the one or more free radical hydrogen donors produced are selected from the group consisting of hydroxy, hydroperoxy, and alkylperoxy.

15. A method of reducing the concentration of polychlorinated dibenzo-p-dioxins (PCDD) or polychlorinated dibenzofurans (PCDF) compounds in a gas steam comprising:
   a. directing the gas stream to a Stage I treatment area and irradiating the gas stream with light in the presence of one or more free radical hydrogen donors so as to reduce a concentration of PCDD or PCDF precursor compounds in the gas stream and detoxifying the PCDD or PCDF compounds by direct photolysis;
   b. after treatment in Stage I, treating the gas stream by removing particulate matter from the gas stream; and
   c. in a Stage II treatment, irradiating the gas stream with light in the presence of one or more free radical hydrogen donors to reduce the concentration of PCDD and/or PCDF compounds in the gas stream.

16. The method of claim 15 including irradiating the gas stream in the Stage I treatment with light that falls within the spectral range of 250–500 nanometers and irradiating the treated gas stream in the Stage II treatment with light that falls within the spectral range of 290–500 nanometers.

17. The method of claim 15 wherein at least a portion of the treated gas stream is, after treatment in Stage II, returned to the Stage I for further treatment.

18. The method of claim 15 including collecting the removed particulate and directing the particulate to a Stage III treatment area where the particulate is subjected to further irradiation.

19. The method of claim 15 wherein irradiating the gas stream produces one or more free radical hydrogen donors that facilitate dechlorination of the PCDD or PCDF compounds.

20. The method of claim 19 wherein the PCDD and PCDF precursor compounds are selected from the group consisting of chlorine gas, chlorophenol compounds and chlorobenzene compounds, and wherein at least a portion of the precursor compounds is converted to hydrogen chloride.

21. The method of claim 20 including irradiating the gas stream in Stage I with light falling within the spectral range of 250–500 nanometers; and irradiating the gas stream in Stage II with light falling within the spectral range of 290–500 nanometers.

22. A method of reducing the concentration of polychlorinated dibenzo-p-dioxins (PCDD) or polychlorinated dibenzofurans (PCDF) compounds in a gas stream produced by a cement manufacturing facility comprising irradiating the gas stream with light to generate one or more free radical hydrogen donors so as to chemically modify by dechlorinating a portion of PCDD or PCDF precursor compounds within the gas stream and/or convert by dechlorinating the PCDD or PCDF compounds within the gas stream to less toxic compounds.

23. The method of claim 22 including directing the gas stream through a pyroprocessing section of the cement manufacturing facility; treating the gas steam by removing particulate matter from the gas stream; and irradiating the treated gas stream with light that falls within the spectral range of 290–500 nanometers in the presence of at least one free radical hydrogen donor so as to facilitate dechlorination of the PCDD or PCDF compounds within the gas stream.

24. The method of claim 23 wherein chemically modifying the PCDD or PCDF precursor compounds includes irradiating the gas stream with light after the gas stream has exited the pyroprocessing section of the cement manufacturing facility but before treating the gas stream.

25. The method of claim 24 wherein the light utilized to chemically modify said PCDD or PCDF precursor compounds falls within the spectral range of 250–500 nanometers.

26. The method of claim 22 wherein the PCDD compound is 2, 3, 7, 8 tetrachlorodibenzo-p-dioxin and is converted to a lower chlorinated PCDD compound form.

27. The method of claim 22 wherein the precursor PCDD or PCDF compounds are selected from the group consisting of chlorine gas, chlorophenol compounds and chlorobenzene compounds, and wherein the portion of said precursor compounds are converted to hydrogen chloride.

28. A method of producing cement and reducing the concentration of polychlorinated dibenzo-p-dioxins (PCDD)

or polychlorinated dibenzofurans (PCDF) compounds in a resulting gas stream comprising:

a. directing a raw feed into a pyroprocessing system of a cement manufacturing facility, and heating the raw feed as the raw feed moves through the pyroprocessing system;

b. directing the heated raw feed through at least one kiln that forms a part of the pyroprocessing system to produce cement clinker;

c. heating the pyroprocessing system and directing the resulting gas through the pyroprocessing system;

d. directing the gas stream from the pyroprocessing system and treating the gas stream by removing particulate matter from the gas stream; and e. irradiating the gas stream after treatment with light in the presence of at least one free radical hydrogen donor so as to facilitate the dechlorination of at least some of the PCDD or PCDF compounds.

29. The method of claim 28 wherein the treated gas stream is irradiated with light falling within the spectral range of 290–500 nanometers.

30. The method of claim 28 wherein irradiating the gas stream includes radiating the gas stream with light that falls within the spectral range of 290–500 nanometers and wherein the intensity and duration of said irradiation and the amount of said free radical hydrogen donors being effective to degrade a substantial portion of said PCDD and PCDF compounds within the gas stream.

31. The method of claim 28 including exposing the treated gas stream to light, falling within the spectral range of 290 to 500 nanometers, of sufficient intensity and for a sufficient residency time to dechlorinate at least some toxic PCDD and/or PCDF compounds contained within the gas stream.

32. The method of claim 31 wherein the irradiation of the treated gas stream to facilitate the dechlorination of at least some of the PCDD or PCDP compounds is accomplished substantially without the aid of photocatalysts.

33. The method of claim 28 including exposing the treated gas stream to light, falling within the spectral range of 290–500 nanometers, of sufficient residency time to degrade the PCDD compound, wherein the PCDD compound is 2, 3, 7, 8 tetrachlorodibenzo-p-dioxin, to a lower chlorinated form PCDD compound.

34. A method of detoxifying polychlorinated dibenzo-p-dioxins (PCDD) or polychlorinated dibenzofurans (PCDF) compounds within an industrial gas stream comprising irradiating the gas stream, producing one or more free radical hydrogen donors; and dechlorinating the PCDD or PCDF compounds by reacting the one or more of the free radical hydrogen donors with the PCDD or PCDF compounds.

35. The method of claim 34 including irradiating the gas stream with light falling within the spectral range of 290–500 nanometers, producing the one or more of the free radical hydrogen donors as a result of the irradiation, and converting at least one of the PCDD or PCDF compounds to a lower chlorinated form as a result of the irradiation.

36. The method of claim 35 including removing particulate matter from the gas stream prior to the irradiation.

37. The method of claim 34 including targeting PCDD or PCDF precursor compounds in the gas stream and irradiating the precursor compounds and chemically modifying the precursor compounds to form different chemical compounds that do not react to form the PCDD or PCDF compounds.

38. The method claim 37 including irradiating the PCDD or PCDF precursor compounds with light falling within the spectral range of 250–500 nanometers.

39. The method of claim 34 wherein the gas stream is produced by a cement manufacturing facility and the method further includes directing the gas stream from a pyroprocessing system of the cement manufacturing facility to a reactor, and irradiating the gas stream in the reactor to: (1) chemically modify PCDD or PCDF precursor compounds to chemical compounds that do react to form the PCDD or PCDF compounds, or (2) produce the one or more of the free radical hydrogen donors which reacts with one or more of the PCDD or PCDF compounds to form at least one dechlorinated form of the PCDD or PCDF compounds.

40. The method of claim 34 wherein the one or more free radical hydrogen donors produced are selected from the group consisting of hydroxy, hydroperoxy, and alkylperoxy.

* * * * *